(12) United States Patent
Schimmel

(10) Patent No.: US 6,857,867 B2
(45) Date of Patent: Feb. 22, 2005

(54) BACKFLOW PREVENTION DEVICE

(75) Inventor: Dieter Schimmel, Roth (DE)

(73) Assignee: Demag Ergotech GmbH, Schwaig (DE)

( * ) Notice: Subject to any disclaimer, the term of this patent is extended or adjusted under 35 U.S.C. 154(b) by 139 days.

(21) Appl. No.: 10/385,246

(22) Filed: Mar. 10, 2003

(65) Prior Publication Data

US 2004/0013763 A1 Jan. 22, 2004

(30) Foreign Application Priority Data

Mar. 9, 2002 (DE) ............................... 102 10 464

(51) Int. Cl.$^7$ ............................................. B29C 45/52
(52) U.S. Cl. ...................... 425/559; 425/562; 425/563
(58) Field of Search ................................ 425/559, 562, 425/563

(56) References Cited

U.S. PATENT DOCUMENTS

| | | | | |
|---|---|---|---|---|
| 4,643,665 | A | * 2/1987 | Zeiger | 425/563 |
| 5,167,971 | A | 12/1992 | Gill et al. | |
| 5,304,058 | A | * 4/1994 | Gill | 425/562 |
| 6,203,311 | B1 | * 3/2001 | Dray | 425/562 |
| 6,227,841 | B1 | * 5/2001 | Viron | 425/563 |
| 6,270,703 | B1 | * 8/2001 | Wildman et al. | 425/559 |
| 6,499,987 | B1 | * 12/2002 | Durina et al. | 425/563 |
| 6,530,777 | B1 | * 3/2003 | Ganz et al. | 425/561 |
| 6,533,567 | B2 | * 3/2003 | Suganuma et al. | 425/559 |
| 6,554,603 | B1 | * 4/2003 | Schreiner et al. | 425/562 |

FOREIGN PATENT DOCUMENTS

| | | |
|---|---|---|
| DE | 1 266 486 | 4/1968 |
| DE | 102 959 | 1/1974 |
| DE | 25 18 219 | 11/1976 |
| DE | 32 47 272 C2 | 6/1984 |
| DE | 198 19 808 A1 | 5/1999 |
| GB | 1505013 | 3/1978 |
| JP | 62-130818 | 6/1987 |
| JP | 01087218 A | 3/1989 |
| JP | 2000229341 A | 8/2000 |
| WO | WO 00/23248 | 4/2000 |

* cited by examiner

Primary Examiner—Tim Heitbrink
(74) Attorney, Agent, or Firm—Henry M. Feiereisen

(57) ABSTRACT

A backflow prevention device for a plasticizing and injection screw axially movable in a plasticizing cylinder of an injection molding machine, includes a base body having a leading head portion and a trailing neck portion and formed with a channel for passage of plastic melt by the screw to an anterior screw space, whereby a check valve is disposed in the channel. Bearing against an inner wall of the plasticizing cylinder and axially moving between open and closed positions is a locking ring so positioned behind the head portion in the area of the neck portion as to define a gap with the base body. The locking ring has a leading stop surface in sealing contact with a confronting base of the head portion, when the locking ring is in open position, and a trailing stop surface in sealing contact with the pressure ring, when the locking ring is in closed position, wherein the inlet opening of the channel is so disposed in the base body that the leading stop surface of the locking ring is prevented from overlapping the inlet opening, when the locking ring is in open position.

7 Claims, 1 Drawing Sheet

BACKFLOW PREVENTION DEVICE

CROSS-REFERENCES TO RELATED APPLICATIONS

This application claims the priority of German Patent Application, Serial No. 102 10 464.6-16, filed Mar. 9, 2002, pursuant to 35 U.S.C. 119(a)–(d), the disclosure of which is incorporated herein by reference.

BACKGROUND OF THE INVENTION

The present invention relates, in general, to a backflow prevention device in combination with a plasticizing and injection screw axially movable in a plasticizing cylinder of an injection molding machine.

Injection molding of thermoplastic material involves the use of a screw which is received in a plasticizing cylinder for movement in an axial direction and rotates therein. Friction caused by the movement and rotation of the screw and exposure to heat generated by heating bands mounted on the outside of the plasticizing cylinder result in a melting of the plastic granulate. The screw operates also as a plunger to inject the plastic melt into a cavity of a molding tool, as the screw is moved in axial direction in the plasticizing cylinder. A backflow of plastic melt during the injection process, as the non-rotating screw moves forward, is prevented by the use of a backflow prevention device or non-return valve. It will be understood by persons skilled in the art that the terms "backflow prevention device" and "non-return device" are used synonymous in the disclosure.

International patent publication WO 00/23248 describes the application of a non-return valve which includes a locking sleeve or a locking ring positioned at the leading end of the screw. During the injection process, the locking ring is pressed against a pressure ring surface of a base body arranged at the head portion of the screw. The locking ring is lifted off the pressure and stop surface and pressed against the stop surfaces of blades arranged at the head of the base body, during metering, i.e. as the screw reverses and rotates. The locking ring is freely movable relative to the screw and is prevented from rotating during metering as a consequence of friction upon the wall of the plasticizing cylinder or rotates at little speed. As a result, friction is encountered between the locking ring and the stop surfaces of the blades.

German Pat. No. DE 32 47 272 C2 describes a ring-type backflow prevention device having balls disposed between a locking sleeve and the stop surface of a base body arranged at the screw head. These balls, which are distributed about the circumference, serve as spacers between the locking sleeve and the base body and at the same time operate as ball bearing to thereby provide better friction conditions between the base body of the backflow prevention device and the locking sleeve.

Conventional ring-type backflow prevention devices suffer shortcomings because the closing process is normally subjected to stochastic influences so that scattering is caused during the injection process. Moreover, ring-type backflow prevention devices exhibit comparably poor response or closing behavior during the injection process.

A different type of backflow prevention devices are so-called ball-type backflow prevention devices which include one or more balls received in bores in a cylindrical portion of the screw head and operate like ball check valves. Examples of such types of backflow prevention devices include German patent publication DE 198 19 808 A1 or German Pat. No. DE 1 266 486. The bores have each two regions of different diameter and a transition zone which serves as sealing surface. The diameter of the bore region positioned upstream of the transition zone, as viewed in transport direction of the melt, is greater than the diameter of the downstream region to provide a support for the ball to serve as locking member. During the metering process, plastic melt flowing through the narrow bore lifts the ball away from the sealing surface to clear the passage for melt to flow to the region of greater diameter. Melt can thus flow through the bore past the ball or balls into the anterior screw space. To prevent the balls from leaving the wider region of the bores, the bores extend slantingly in the direction toward the inner wall of the plasticizing cylinder. Other approaches propose a construction of bores to extend into the anterior screw space, whereby stays or like structures are provided in the bores to prevent an escape of the balls from the bore.

Although ball-type backflow prevention devices exhibit better response and closing behavior than ring-type backflow prevention devices, they suffer shortcomings because measures must be taken to minimize wear of the cylindrical portion of the screw head upon the corresponding inner wall of the plasticizing cylinder through selection of a sufficiently sized gap width between these components. This is especially relevant, when the screw has a great diameter. As a result of this measure, a leakage flow is encountered from the anterior screw space through the gap to the rear, after closing of the ball, so that a required holding pressure can no longer be applied during the injection molding operation. Dimensioning of the gap width further requires consideration of the shearing sensitivity of the plastic materials. When the gap is too narrow, melt film located in the gap would be exposed to great shearing forces, resulting in decomposition, color changes or changes of additives, such as, e.g., oxidation of flame-inhibiting additives. Thus, modified melt components reach the cavity together with clean melt, so that the finished article has poor quality. On the other hand, when the gap is too great, the afore-mentioned leakage flow is encountered. As a consequence, the configuration of a ball-type backflow prevention device requires a compromise between the need for a small leakage flow (smallest possible gap width), on one hand, and small wear of the screw and small shearing forces in the plastic material (greatest possible gap width), on the other hand.

It would therefore be desirable and advantageous to provide an improved backflow prevention device which obviates prior art shortcomings and which exhibits a good response and closing behavior, while preventing leakage flow from the anterior screw space as well as undesired shearing forces upon the plastic material.

SUMMARY OF THE INVENTION

According to one aspect of the present invention, a backflow prevention device in combination with a plasticizing and injection screw axially movable in a plasticizing cylinder of an injection molding machine, includes a base body having a leading head portion and a trailing neck portion of a diameter which is smaller than a diameter of the head portion, with the base body formed with at least one channel, which has an inlet opening, for passage of plastic melt by the screw to an anterior screw space, a check valve disposed in the channel, a pressure ring disposed on the base body, and a locking ring, which bears against an inner wall of the plasticizing cylinder and moves in an axial direction between open and closed positions, wherein the locking ring is so positioned behind the head portion of the base body in the area of the neck portion as to define a gap with the base body, wherein locking ring has a leading stop surface in sealing contact with a confronting base of the head portion, when the locking ring is in the open position, and a trailing stop surface in sealing contact with the pressure ring, when the locking ring is in closed position, wherein the inlet opening of the channel is so disposed in the base body that the leading stop surface of the locking ring is prevented from completely overlapping the inlet opening, when the locking ring is in open position.

The present invention resolves prior art problems by realizing a rapid response by the ball to close the melt channel (rapid response behavior) and by generating a pressure drop in view of the interrupted backflow as a result of the locking ring so that the locking ring is shifted against the pressure ring to seal the anterior screw space. By splitting the functions "closing", on one hand, and "sealing", on the other hand, the base of the head portion may form a distinct gap with the inner wall of the plasticizing cylinder. In this way, friction and wear are prevented in this area. Moreover, plastic material is no longer subject in this area to undesired shearing forces, and the flow conditions in the gap can be best suited through appropriate dimensioning of the base of the head portion.

According to another feature of the present invention, the head portion may have a generally conically extending tip.

According to another feature of the present invention, the base of the head portion may have an outer diameter which is between 70% and 90% of an inner diameter of the plasticizing cylinder, preferably between 75% and 85% of an inner diameter of the plasticizing cylinder.

According to another feature of the present invention, the check valve may be a ball check valve.

According to another feature of the present invention, the leading and trailing stop surfaces of the locking ring, and/or the surfaces of the base body interacting with the leading and trailing stop surfaces of the locking ring may have ceramic insets and/or hard metal insets.

According to another feature of the present invention, the leading and trailing stop surfaces of the locking ring, and/or the surfaces of the base body interacting with the leading and trailing stop surfaces of the locking ring may be provided with a wear-resistant protective coating

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 4:
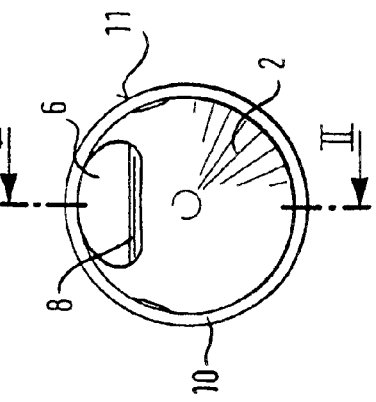
FIG. 4 is a cross sectional view of the backflow prevention device, taken along the line IV—IV in FIG. 3

Throughout all the Figures, same or corresponding elements are generally indicated by same reference numerals. These depicted embodiments are to be understood as illustrative of the invention and not as limiting in any way.

Turning now to the drawing, there is shown a backflow prevention device according to the present invention for use with a plasticizing and injection screw (not shown) which is axially movable in a plasticizing cylinder 17 of an injection molding machine. The backflow prevention device includes a base body, generally designated by reference numeral 1 and including a leading head portion 2 with conical tip, a cylindrical neck portion 3 and an end piece 4. The head portion 2 has a base defined by a diameter $D_K$ (FIG. 3) which is smaller than an inner diameter of the plasticizing cylinder 17 so that a distinct gap 18 is formed between the outer side of the head portion 2 and an inner wall 17a of the plasticizing cylinder 17. The neck portion 3 is defined by a diameter $D_S$ which is smaller than a diameter $D_E$ of the end piece 4. The end piece 4 has a leading end for support of a pressure ring 5 and a trailing end which is formed with a thread 4a for attachment of the backflow prevention device to the plasticizing screw.

Figure 1:
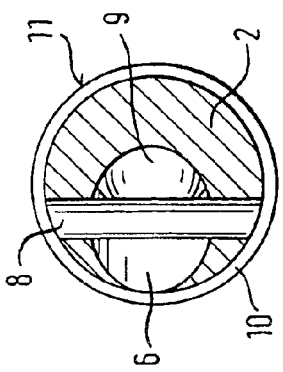
FIG. 1 is a front view of a backflow prevention device according to the present invention.
Figure 3:
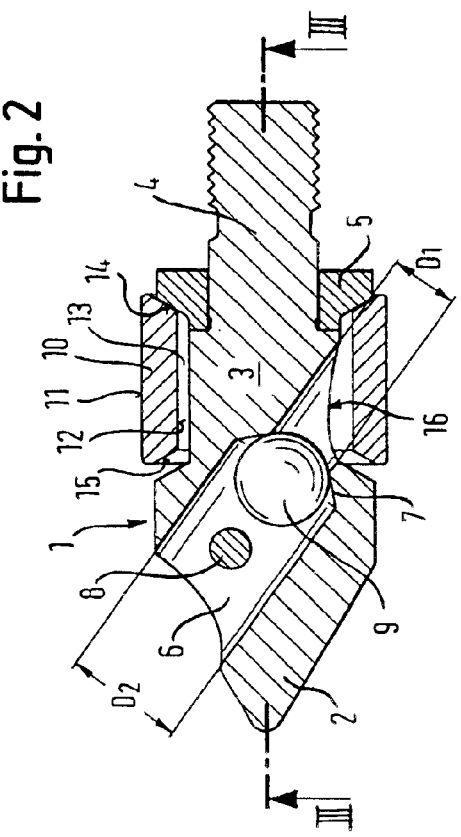
FIG. 3 is a 90° rotated longitudinal section of the backflow prevention device, taken along the line III—III in FIG. 2.
Figure 2:
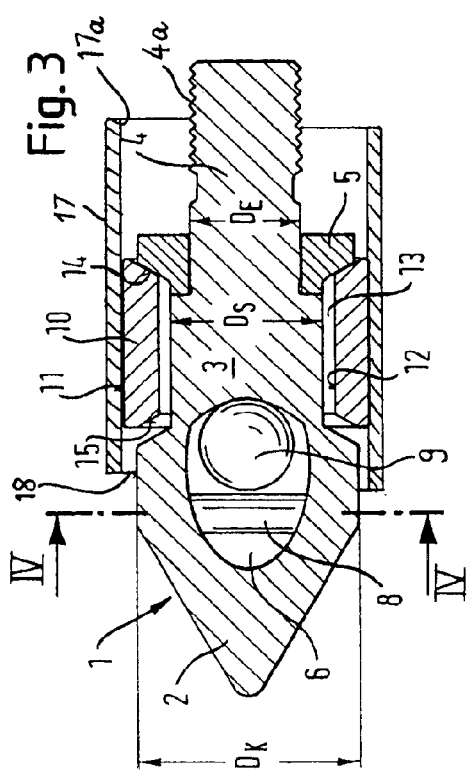
FIG. 2 is a longitudinal section of the backflow prevention device, taken along the line II—II in FIG. 1.

A channel 6 is formed in the base body 1 and extends from the neck portion 3 forward toward the head portion 2. As shown in particular in FIG. 2, the channel 6 has a first section defined by a diameter D1 and a second section defined by a diameter D2, whereby the diameter D1 is smaller than the diameter D2. A transition zone 7 extends between the first and second channel sections. Positioned in a forward region of the channel 6 is a stay or pin 8, which extends across the channel 6, as shown in FIGS. 1 and 4, whereby a ball 9 is freely movable between the pin 8 and the transition zone 7. The illustrations of FIGS. 2 and 3 represent the closing position of the backflow prevention device, whereby the ball 9 bears firmly against a seat in the transition zone 7 to seal the channel 6 against any backflow of plastic melt.

Positioned in the area of the neck portion 3 between the pressure ring 5 and the head portion 2 is a locking ring 10 which is movable in axial direction. The locking ring 10 has an outer diameter which is so selected as to rest firmly against the inner wall 17a of the plasticizing cylinder 17 so that melt is prevented from escaping from an anterior screw space through migration between the outer wall 11 and the inner wall 17a of the plasticizing cylinder 17. Bounded between an inner wall 12 of the locking ring 10 and the neck portion 3 is an annular gap 13 which is in communication with an inlet port 16 of the channel 6, as shown in FIG. 2. The locking ring 10 has a trailing stop surface 14, which closely bears against the pressure ring 5, when the backflow prevention device occupies the closed position, shown in FIGS. 2 and 3, and has a leading stop surface 15, which bears against a base of the head portion 2, when the locking ring 10 occupies an open position. Hereby, the inlet opening 16 of the channel 6 is so disposed in the neck portion 3 that the leading stop surface 15 is prevented from overlapping the inlet opening 16, when the locking ring 10 is in the open position.

Suitably, the base of the head portion 2 has an outer diameter which is between 70% and 90%, preferably between 75% and 85%, of an inner diameter of the plasticizing cylinder 17.

In the open position, i.e. during metering operation, the locking ring 10 rests against the base of the head portion 2, while the trailing stop surface 15 defines a gap with the pressure ring 5 to allow ingress of plastic melt into the annular gap 13. From there, plastic melt flows to the inlet opening 16 of the channel 6 and lifts the ball 9 away from the transition zone 7 against the pin 8. The channel 6 is hereby cleared so that plastic melt is able to flow past the ball 9 into the anterior screw space.

Once the metering process has terminated and the plasticizing screw is advanced forwards for injection of plastic melt into a molding tool (not shown), the ball 9 is rapidly pressed backwards against the seat in the transition zone 7 to seal the channel 6. In this way, the quick response behavior of a ball-type backflow prevention device or in general of ball check valves is exploited here. When the ball 9 closes, backflow of plastic melt between the locking ring 10 and the pressure ring 5 is cut. The pressure drop generated hereby between this area and the anterior screw space causes the locking ring 10 to shift backwards against the pressure ring 5 so that the anterior screw space is fully sealed toward the rear. As the plasticizing screw is further advanced, a desired holding pressure can easily be applied during the injection operation.

Although not shown in the drawing, the leading stop surface 15 and the trailing stop surface 14 of the locking ring 10, and/or the surfaces of the base body 1 interacting with the leading and trailing stop surfaces 15, 14 of the locking ring 10 may have ceramic insets and/or hard metal insets. Of course, it is also conceivable to provide the leading stop surface 15 and the trailing stop surface 14 of the locking ring 10, and/or the surfaces of the base body 1 interacting with the leading and trailing stop surfaces 15, 14 of the locking ring 10 with a wear-resistant protective coating. An example of such insets or coatings is disclosed and described in international patent publication WO 00/23248, published Apr. 27, 2000, to which reference is made herewith.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A backflow prevention device in combination with a plasticizing and injection screw axially movable in a plasticizing cylinder of an injection molding machine, comprising:

a base body defined by an axis, said base body having a leading head portion and a trailing neck portion of a diameter which is smaller than a diameter of the head portion, said base body formed with at least one channel for passage of plastic melt by the screw to an anterior screw space, said channel having an inlet opening;

a check valve disposed in the channel;

a pressure ring disposed on the base body; and a locking ring, bearing against an inner wall of the plasticizing cylinder and moving in an axial direction between open and closed positions, said locking ring being so positioned behind the head portion of the base body in the area of the neck portion as to define a gap with the base body, said locking ring having a leading stop surface, which is in sealing contact with a confronting base of the head portion, when the locking ring is in the open position, and a trailing stop surface, which is in sealing contact with the pressure ring, when the locking ring is in closed position, wherein the inlet opening of the channel is so disposed in the base body that the leading stop surface of the locking ring is prevented from completely overlapping the inlet opening, when the locking ring is in open position.

2. The backflow prevention device of claim 1, wherein the head portion has a generally conically extending tip.

3. The backflow prevention device of claim 1, wherein the base of the head portion has an outer diameter which is between 70% and 90% of an inner diameter of the plasticizing cylinder.

4. The backflow prevention device of claim 1, wherein the base of the head portion has an outer diameter which is between 75% and 85% of an inner diameter of the plasticizing cylinder.

5. The backflow prevention device of claim 1, wherein the check valve is a ball check valve.

6. The backflow prevention device of claim 1, wherein at least one of the leading and trailing stop surfaces of the locking ring, and surfaces of the base body interacting with the leading and trailing stop surfaces of the locking ring, have at least one of a ceramic inset and hard metal inset.

7. The backflow prevention device of claim 1, wherein at least one of the leading and trailing stop surfaces of the locking, ring and surfaces of the base body interacting with the leading and trailing stop surfaces of the locking ring, are provided with a wear-resistant protective coating.

* * * * *